(12) United States Patent
Holcombe et al.

(10) Patent No.: US 7,536,005 B2
(45) Date of Patent: May 19, 2009

(54) RING DETECTION AND SNOOP CIRCUIT

(75) Inventors: Wayne T. Holcombe, Mountain View, CA (US); Vitor Pereira, Azueira (PT); Tiago Marques, Santiago do Cacém (PT)

(73) Assignee: Silicon Laboratories, Inc., Austin, TX (US)

( * ) Notice: Subject to any disclaimer, the term of this patent is extended or adjusted under 35 U.S.C. 154(b) by 771 days.

(21) Appl. No.: 11/291,731

(22) Filed: Dec. 1, 2005

(65) Prior Publication Data

US 2006/0210064 A1    Sep. 21, 2006

Related U.S. Application Data

(60) Provisional application No. 60/632,839, filed on Dec. 3, 2004, provisional application No. 60/633,478, filed on Dec. 6, 2004.

(51) Int. Cl.
*H04M 1/00* (2006.01)

(52) U.S. Cl. .................................. 379/399.01; 379/166

(58) Field of Classification Search ............ 379/399.01, 379/156, 162, 163, 166, 387.01, 402, 413.12
See application file for complete search history.

(56) References Cited

U.S. PATENT DOCUMENTS

| | | | | |
|---|---|---|---|---|
| 5,864,591 | A * | 1/1999 | Holcombe | 375/345 |
| 7,020,292 | B1 * | 3/2006 | Heubel et al. | 381/94.5 |
| 2005/0169250 | A1 * | 8/2005 | Kwak | 370/352 |

* cited by examiner

*Primary Examiner*—Creighton Smith
(74) *Attorney, Agent, or Firm*—Francissen Patent Law, P.C.

(57) ABSTRACT

A ring detect circuit is shown that includes a regenerative latch configured to be coupled to a telephone line. The regenerative latch is configured to generate a fast transient signal in response to a ring signal on the telephone line. The latch is coupled to an isolation transformer through a capacitor. The fast transient passes across the capacitor and through the transformer. A comparator detects the fast transient and, responsive thereto, generates a ring detect signal.

19 Claims, 3 Drawing Sheets

RING DETECTION AND SNOOP CIRCUIT

CROSS REFERENCE TO RELATED APPLICATIONS

This application claims priority to U.S. Provisional Patent Application no. 60/632,839 filed Dec. 3, 2004, entitled RING DETECTION AND SNOOP CIRCUIT, herein incorporated by reference in its entirety. This application also claims priority to U.S. Provisional Patent Application no. 60/633,478 filed Dec. 6, 2004, entitled TELEPHONE INTERFACE CIRCUITRY, herein incorporated by reference in its entirety.

BACKGROUND OF THE INVENTION

In a telephony data access arrangement (DAA) circuit, there is a need to monitor (snoop) the line when the system is in an on-hook condition. In a transformer based DAA, this has to be done without the help of any direct DC monitoring, or communication, as the transformer isolates these components. There are techniques in use that take advantage of an extra monitor loop that bypasses the transformer by use of an extra and expensive opto-isolation device.

Typically, a conventional modem ring detect circuit uses an opto-isolator, two zener diodes, three resistors and a large film capacitor, e.g. typically 0.47 uF, 250 V. Conventional circuits typically produce a single pulse per ring cycle (13 Hz-68 Hz) output for ring signals above a set threshold (typically around 25 VRMS). The opto-isolator and the large film capacitor are relatively expensive compared to the other components and the opto-isolator must be laid out on the circuit board in such a way as to maintain regulatory voltage isolation. The latter requires board space and creates other layout constraints. Another problem with such a conventional circuit is that the ring detect threshold is determined by the zener diode component values and, as a consequence, it is not as easy to change the threshold when using these components as it is when using resistors.

In a basic data access arrangement (DAA), there are two other main functions, besides ring detection, that need voltage isolation—hook control and the audio signal paths. One method for reducing the cost of the DAA is to integrate or encode the ringer information on the audio signal path. One method of doing this in a transformer DAA is to use the on hook audio snoop path, which is commonly used for Caller ID, that goes around the hook switch.

To build an analog low frequency filter and detect circuitry generally requires components external to an integrated circuit (IC) or analog to digital (A/D) conversion with significant dedicated digital signal processing; either of these approaches increases costs.

SUMMARY OF THE INVENTION

An embodiment of a method for ring signal detection in a telephone line interface circuit having an isolation transformer calls for receiving a ring signal in a line side circuit coupled to a telephone line and, responsive to the ring signal, generating a high-speed transient signal in response to a ring signal on a telephone line. The method also sets forth receiving the high-speed transient signal in a modem side circuit through the isolation transformer and converting the high-speed transient signal into a ring detection signal. A further refinement of the method calls for generating a high-speed transient signal in response to a ring signal on a telephone line using an oscillator. In another refinement, the step of converting the high-speed transient signal into a ring detection signal further involves the step of detecting, stretching, and integrating the high-speed transient signal to produce an integrated ring pulse signal. In a further refinement, the step of converting the high-speed transient signal into a ring detection signal further includes the steps of counting a first time period value that is less than a predetermined off-time of the ring signal in response to the integrated ring pulse signal in order to generate a dump signal and, responsive to the dump signal, counting a second time period value that is larger than a period of a carrier frequency of the ring signal and clearing the integrated ring pulse signal. This refinement also calls for generating a qualified ring detection signal responsive to a time-out of the second time period value.

An embodiment of a ring detect circuit for a telephone line interface circuit having a line side circuit and a modem side circuit isolated from one another by an isolation transformer includes an oscillator disposed in the line side circuit and configured to be coupled to the isolation transformer and to tip and ring terminals of a telephone line pair and generate a high-speed transient signal responsive to a ring signal on the tip and ring terminals as well as a detection circuit disposed in the modem side circuit and configured to be coupled to the isolation transformer, where the detection circuit is further configured to receive the high-speed transient signal and, responsive thereto, generate a ring detect signal. In a further refinement of this embodiment, the oscillator further comprises a regenerative latch. In another refinement, the detection circuit further includes a pulse detect and stretch circuit configured to be coupled to the isolation transformer and receive the high-speed transient signal and a first switch coupled in series with a capacitor between two power supply rails, where the first switch is controlled by an output of the pulse detect and stretch circuit to charge the capacitor in order to produce a ring pulse signal. In a still further refinement, the detection circuit includes a first counter configured to count a first selected time period value, the first counter having a control input for starting the first counter responsive to the ring pulse signal and an output that produces a dump signal when the first counter counts out the first selected time period value, a second switch coupled in parallel with the capacitor and controlled by the dump signal so that the capacitor is discharged in response to the dump signal, and a second counter configured to count a second selected time period value, the second counter having a control input for starting the second counter in response to the dump signal and an output that produces a ring detect signal when the second counter counts out the second selected time period value. Further, Providing an external programming interface allows the first and second selected time period values to be selected by externally programming the first and second counters, respectively.

BRIEF DESCRIPTION OF THE DRAWINGS

Certain embodiments are described below with reference to the following drawings, wherein.

DETAILED DESCRIPTION OF THE EMBODIMENTS

Figure 1:
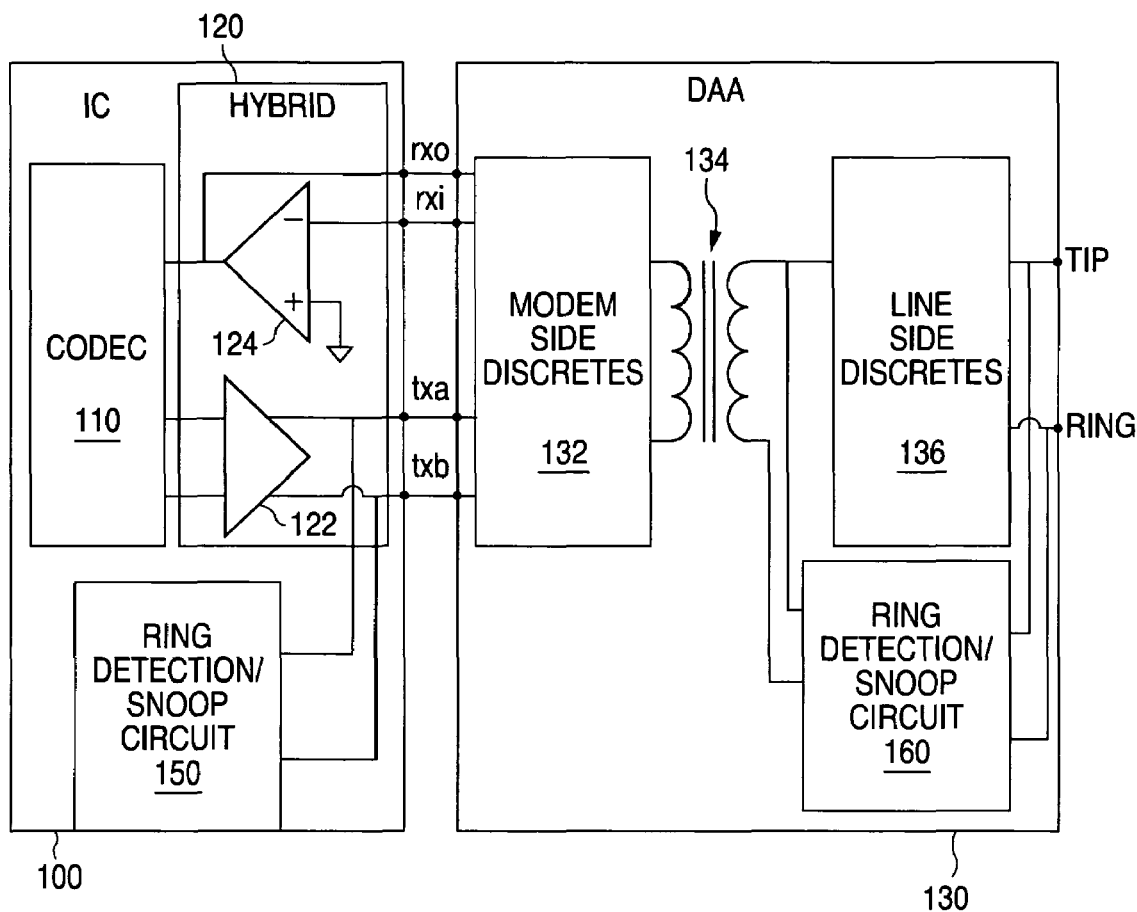
FIG. 1 is a functional block diagram of a telephone line interface circuit.

In a transformer based DAA, e.g. a DAA that utilizes a transformer to provide electrical isolation between the line and modem sides, a cost effective way to implement the snooping function for Caller ID or line monitoring is to provide a small capacitor bypass around the hook switch function. The capacitor bypass value is typically on the order of 10-100 nF and commonly may have some series resistance of approximately 10K-100K ohms. The small value of the capacitance and combined series resistance limits excess loading of the telephone line.

Typically, during on-hook snooping, the transformer output is unloaded so that the high impedance audio path through the bypass capacitor is not loaded. The effect of this is to provide adequate audio levels and band-pass for the Caller ID signal processing circuit. As an example, a 10 nF bypass capacitor has about 16K ohms of impedance at 1 KHz. A typical high speed modem transformer has 3 Henrys of shunt inductance that has an impedance of about 19K ohms at 1 KHz. Therefore, if the transformer is unloaded, the audio attenuation at 1 Khz is only a few decibels (dB). At lower frequencies, the attenuation increases by 12 dB per octave due to the second order roll-off provided by the bypass capacitor and the shunt inductance of the transformer. For Caller ID or other audio snoop functions (e.g. DTMF decoding, audio line in use detection) the low frequency roll-off is not a problem.

Although the above technique can be used for ring detection, the second order roll-off creates a number of difficulties. For a 20 Hz ring signal, as in the example above, the ring signal would be attenuated by over 66 dB, a factor of over 2000. However, because ring signals have significant harmonics, often exceeding 20%, the resultant harmonics will be boosted by 12 dB per octave relative to the fundamental. As a consequence, the harmonics presented on the output of the transformer to the DAA codec IC will typically exceed the amplitude of the fundamental.

These harmonics make it difficult to determine when the amplitude of the ring signal exceeds the correct detect threshold without both filtering out the harmonics and correcting for the transformer and bypass snoop capacitor attenuation. Typically, this requires an algorithm implemented in a modem digital signal processor (DSP) and, of course, requires that the DSP be active during the ring phase. In many applications, this may be a problem since the DSP may not be active or may be in use for some other function. Generally, it is desirable in many applications that the ring detect circuit be active, consume low power, and be independent of other DSP functions.

One embodiment of a ring detect circuit includes a regenerative latch configured to be coupled to a telephone line. The regenerative latch is configured to generate a fast transient signal in response to a ring signal on the telephone line. The latch is coupled to an isolation transformer through a capacitor. The fast transient passes across the capacitor and through the transformer. A comparator detects the fast transient and, responsive thereto, generates a ring detect signal.

In a further refinement of this embodiment, the ring detect signal closes a switch to charge a ring detect capacitor and start a short programmable counter. When the short programmable counter reaches a first programmed count value, it generates a dump signal that starts a long programmable counter and closes a second switch that discharges the ring detect capacitor. When the long programmable counter reaches a second programmed value, it generates a ring detect signal that may be output to a controller.

Another embodiment of a ring detect circuit provides a simple type of ring signal encoding that can be passed through the snoop bypass capacitor and through a transformer. What is shown is a classic regenerative latch constructed from PNP and NPN transistors. See transistors 310 and 320 in FIG. 4 for one embodiment of a regenerative latch. The specific resistor values along with the snoop bypass capacitor determine the minimum ring voltage and minimum dv/dt necessary to trigger or turn on this latch. Typically, the turn on threshold would be set to about 15V. Once the latch turns on, the voltage drop across it drops by the trigger voltage minus the sustaining on voltage (around 1.5V). Consequently, the voltage across the snoop bypass capacitor jumps by about 13.5V but with a very fast edge. This resulting fast edge transient signal is not attenuated by the 12 dB per octave low frequency roll-off but shows up mostly un-attenuated on the output of the transformer where it can easily be detected by very simple circuitry since its magnitude exceeds several volts.

Because the latch can oscillate when it resets itself when the current through it falls below its holding current (set by the resistors), if the detection circuit on the codec or modem side circuit pulse stretches all transients by about 4 ms, any single or multiple oscillation burst will produce a single ring detect pulse per ring cycle, substantially identical to a standard ½ wave opto-isolator ring detect circuit.

This circuit eliminates the large 0.47 uF 250V capacitor and the opto-isolator. The remaining components are similar in cost and component count relative to the remaining ring detect components. Ring detect threshold can be set by adjusting the latch resistor values. The detect threshold is independent of the shunt inductance and Snoop coupling capacitance.

FIG. 1 is a functional block diagram illustrating an embodiment wherein a control integrated circuit (IC) 100 is connected to a DAA circuit 130. The technique used in this design is implemented by adding two blocks 150 and 160 for ring detection and snooping, one 160 in the line side of the DAA and one 150 in the integrated circuit. The circuit block 160 in the DAA 130 includes a controlled oscillator, shown as block 300 in FIG. 3, that is used to bypass the hook switch. Pulses generated by the controlled oscillator can pass through the transformer 134. These pulses take advantage of the high impedance that exists on the modem side. When the hook switch is turned on, the low impedance path that is created disables the oscillator 300. The circuit 150 in the IC contains a pulse detector/stretcher and a bias buffer. Furthermore, the receive channel in codec 110 may also used to digitize the signal created in the line side.

When the circuit is in an on-hook state, the hook switch driver is open and there is no direct current (DC) path between TIP and RING of the telephone line. In the line side circuit 100, the outputs of the hybrid transmit amplifier 122 are set to high impedance. And a small buffer is turned on in order to maintain interface pin txb at a voltage that is half the supply voltage.

The line side oscillator 300 is a pulse generator triggered by the ring signal sine wave that is present at the TIP and RING terminals of the telephone line when a ring event is generated by the telephone system central office. These pulses pass through the transformer and are available at the txa hybrid output interface pin. This pin, when the system is off hook, is also an input of the ring detector 150.

The ring signal can vary in each country or telecommunication market in terms of the frequency/amplitude of the carrier signal, cadence, and frequency of the ring signal itself.

It is, however, typically a carrier multiplied by a pulsed square wave with a very long period. As an example, the ring can be on for 1 second, and off for 2 seconds.

Figure 2:
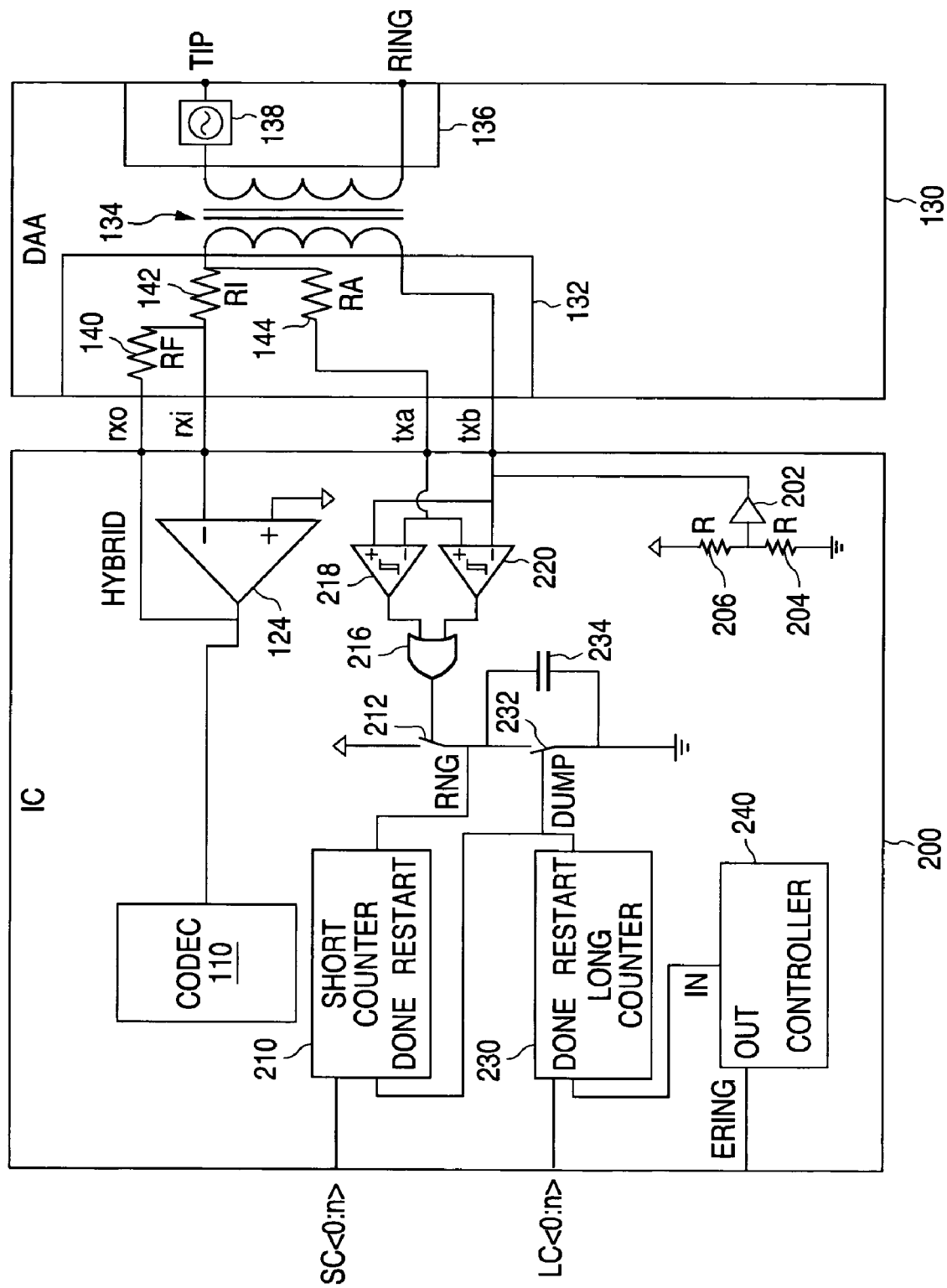
FIG. 2 is a simplified schematic diagram of an embodiment of the ring detect and snoop circuit of FIG. 1.

FIG. 2 is a simplified circuit diagram illustrating an embodiment of the circuitry 200 in the IC and the circuitry in DAA 130 for ring detection. With this implementation, the external circuitry, together with programmable counters, can be tuned to the carrier's characteristics and the external oscillator 138 attached to the telephone line will produce spikes at a given frequency during a part of the ring carrier's period. These spikes, due to the high impedance in the on-hook state, pass through the transformer and appear at the transmit interface terminals txa and txb. A pulse detector and stretcher circuit in the modem side circuit includes a pair of analog comparators 218 and 220 that will detect the high-speed transient received from the oscillator through the transformer and drive a switch 212 coupled in series with a capacitor 234 between two power supply rails. The output of OR gate 216 is integrated by capacitor 234 in order to produce a ring pulse signal RNG at the restart control input of counter 210. Note that resistors 204 and 206, along with a bias buffer 202, serve to maintain interface pin txb at a voltage that is midway between the supply voltage levels, which acts as a reference threshold voltage for comparators 218 and 220. This RNG signal may be passed on to a microprocessor, DSP or other controller to perform ring signal qualification, e.g. measure the frequency of the pulses and count the pulses to identify a valid ring signal.

In the embodiment of FIG. 2, additional circuitry is provided that performs some aspects of ring detection qualification, e.g. verifying reception of a valid ring signal, on the circuit rather than externally. In this ring signal qualification circuitry, the output of OR gate 216 controls switch 212 and charges capacitor 234 to a voltage level that starts short counter 210. The short counter 210 is programmed with a value selected to count a time that is smaller than the expected duration of the off-time of the high-speed transient spike due to a valid ring signal on the telephone line pair. When the short counter 210 times out, a DUMP signal is activated that closes switch 232 and discharges capacitor 234 to clear the RNG signal produced by integrating the high-speed transient signal received from the oscillator. The DUMP signal also causes the long counter 230 to start counting. This way the short counter's programmability will allow flexibility for the external oscillator 138.

The long counter 230 will always be restarted after each dump signal generated by the short counter 210. The long counter 230 is programmed with a value such that its end-of-count time is larger than the period of the ring carrier wave. When long counter 230 times out, it generates a signal IN that is input to controller 240, which outputs an ERING ring detect signal that may be monitored external to the circuit 200. In this way, the ERING signal from the digital controller 240 will be active as long as there's a ring signal on the telephone line. To permit the short and long counters 210 and 230 to be programmable, the IC 200 may be provided with interfaces SC<0:n>and LC<0:n>, or similar interface circuitry such as a serial control interface, that permit the counters to be programmed, for example, by an external controller. For example, the interface may permit a DSP to write values into the counters 210 and 230.

The controller 240 may be programmed to respond after a predetermined number of rings, which can be as low as a single ring. An extra long counter may be implemented in controller 240 that may be used to dismiss a detected ring signal on the telephone line if the programmed number of rings is not reached. The circuit will then wait for another ring sequence to occur.

The use of digital counters is preferred due to the very high time constants involved, as well as the variable nature of the ring signals for each country or region of the world.

Some more robustness can be included on this system if the DONE signal from the short counter 210 is an input to the controller 240. The ring sequence can then be dismissed if a certain number of ring-dump sequences is not reached, this will allow for improved immunity to false ring signals, that can occur due to noise or other perturbations on the phone line.

Figure 4:
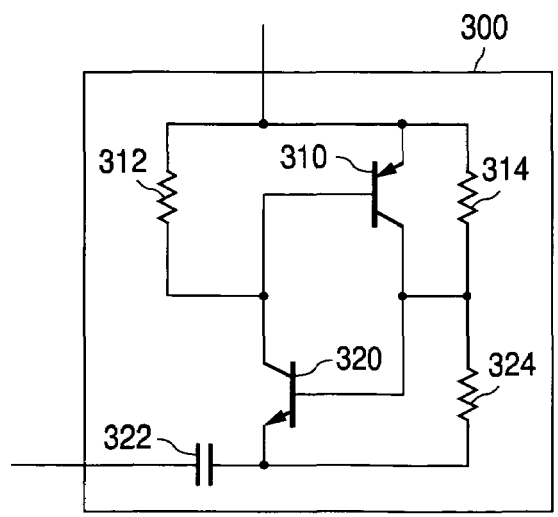
FIG. 4 is a circuit diagram for an embodiment of the oscillator of FIG. 3.
Figure 3:
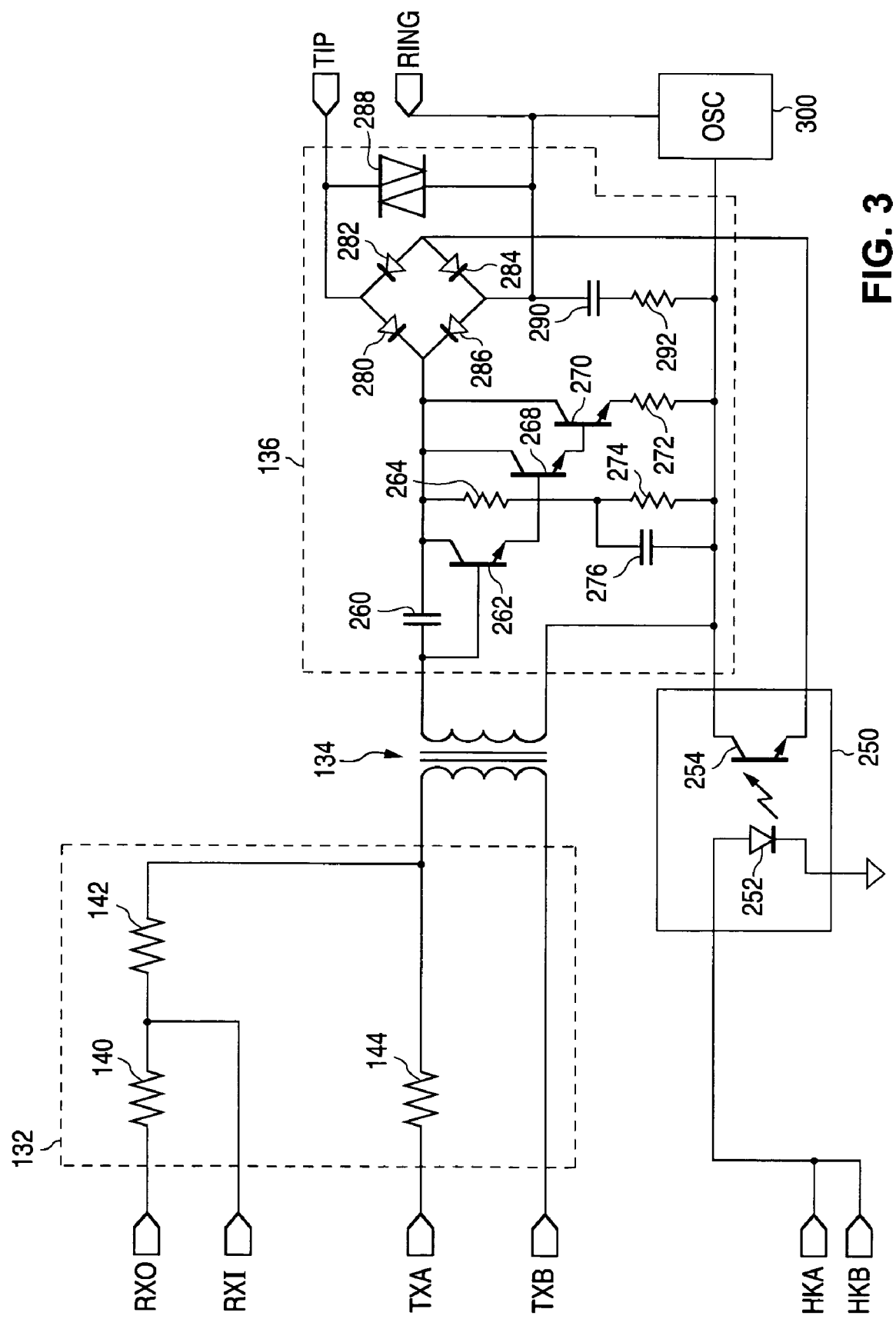
FIG. 3 is a circuit diagram for an embodiment using an oscillator circuit for use in the telephone line interface circuit.

FIG. 3 shows an embodiment of a DAA that includes a controlled oscillator 300 that includes a regenerative latch, such as the latch formed by the pair of bipolar transistors 310 and 320 shown in FIG. 4. The regenerative latch is used to generate a fast edged transient in response to a ring signal present at the TIP and RING terminals of the telephone line pair. The fast edged transient is able to cross snoop capacitor 322 in FIG. 4 and is not highly attenuated by the transformer 134. Consequently, the fast transient ring signal appears at terminals txa and txb of the control IC 200. The oscillator output amplitude is determined by the relation between resistors 314 and 324 and its time constant by the overall resistor and capacitor values. Additional circuitry for implementing other aspects of a DAA function is shown for this embodiment, but are not a necessary part of the invention.

The pulses that are detected at the line side can be acquired and converted by the codec 110 receive channel, which typically includes an analog to digital converter (ADC) function.

As other events besides the ring signal can turn on the oscillator 300 when the system is on-hook, the digital data resulting from the analog to digital conversion can be processed by a host processor that can be programmed to distinguish between various events at the telephone line, such as ring, caller ID, line reversal or line in use detection.

The present circuit may be combined with the circuits described in the following commonly owned patent applications filed Dec. 3, 2004, herein incorporated by reference in their entirety: U.S. Pat. application Ser. No. 60/633,389 for Flexible Hook Switch Driver Circuit, and its corresponding utility application U.S. patent application Ser. No. 11/291,732 now U.S. Pat. No. 7,502,214; U.S. patent application Ser. No. 60/632,910 for Multiplexed Voltage Reference Strategy for Codec and its corresponding utility application U.S. patent application Ser. No. 11,291,733, now U.S. Pat. No. 7,164,377; and U.S. Pat. application Ser. No. 60/633,051 for flexible hybrid structure tunable for different telecom market solutions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A method for ring signal detection in a telephone line interface circuit having an isolation transformer, the method comprising the steps of:
    receiving a ring signal in a line side circuit coupled to a telephone line;
    responsive to the ring signal, generating a high-speed transient signal in response to a ring signal on a telephone line;
    receiving the high-speed transient signal in a modem side circuit through the isolation transformer; and
    converting the high-speed transient signal into a ring detection signal.

2. The method of claim 1, where the step of generating a high-speed transient signal in response to a ring signal on a telephone line further comprises generating a high-speed transient signal in response to a ring signal on a telephone line using an oscillator.

3. The method of claim 2, where the oscillator further comprises a regenerative latch.

4. The method of claim 3, the method including the step of isolating the regenerative latch from a hook switch circuit of the telephone line interface circuit.

5. The method of claim 1, where the step of converting the high-speed transient signal into a ring detection signal further comprises the step of detecting, stretching, and integrating the high-speed transient signal to produce an integrated ring pulse signal.

6. The method of claim 5, where the step of converting the high-speed transient signal into a ring detection signal further comprises the steps of:
    counting a first time period value that is less than a predetermined off-time of the ring signal in response to the integrated ring pulse signal in order to generate a dump signal;
    responsive to the dump signal, counting a second time period value that is larger than a period of a carrier frequency of the ring signal and clearing the integrated ring pulse signal; and
    generating a qualified ring detection signal responsive to a time-out of the second time period value.

7. The method of claim 6, where the step of converting the high-speed transient signal into a ring detection signal further includes the step of:
    monitoring a number of dump signal cycles and disallowing the qualified ring detection signal if a number of the dump signal cycles is less than a predetermined number of cycles.

8. A ring detect circuit for a telephone line interface circuit having a line side circuit and a modem side circuit isolated from one another by an isolation transformer, the circuit comprising:
    an oscillator disposed in the line side circuit and configured to be coupled to the isolation transformer and to tip and ring terminals of a telephone line pair and generate a high-speed transient signal responsive to a ring signal on the tip and ring terminals; and
    a detection circuit disposed in the modem side circuit and configured to be coupled to the isolation transformer, where the detection circuit is further configured to receive the high-speed transient signal and, responsive thereto, generate a ring detect signal.

9. The ring detect circuit of claim 8, where the oscillator further comprises a regenerative latch.

10. The ring detect circuit of claim 9, where the regenerative latch is isolated from a hook switch circuit of the line side circuit by an isolation capacitor.

11. The ring detect circuit of claim 8, where the detection circuit further includes:
    a pulse detect and stretch circuit configured to be coupled to the isolation transformer and receive the high-speed transient signal;
    a first switch coupled in series with a capacitor between two power supply rails, where the first switch is controlled by an output of the pulse detect and stretch circuit to charge the capacitor in order to produce a ring pulse signal.

12. The ring detect circuit of claim 11, where the detection circuit further includes:
    a first counter configured to count a first selected time period value, the first counter having a control input for starting the first counter responsive to the ring pulse signal and an output that produces a dump signal when the first counter counts out the first selected time period value;
    a second switch coupled in parallel with the capacitor and controlled by the dump signal so that the capacitor is discharged in response to the dump signal; and
    a second counter configured to count a second selected time period value, the second counter having a control input for starting the second counter in response to the dump signal and an output that produces a ring detect signal when the second counter counts out the second selected time period value.

13. The ring detect circuit of claim 12, where the detection circuit further includes an external programming interface that allows the first and second selected time period values to be selected by externally programming the first and second counters, respectively.

14. A telephone line interface circuit, the circuit comprising:
    means for receiving a ring signal in a line side circuit coupled to a telephone line;
    means for generating a high-speed transient signal in response to a ring signal on a telephone line responsive to the ring signal;
    means for receiving the high-speed transient signal in a modem side circuit through the isolation transformer; and
    means for converting the high-speed transient signal into a ring detection signal.

15. The telephone line interface circuit 14, where means for generating a high-speed transient signal in response to a ring signal on a telephone line further comprises means for generating a high-speed transient signal in response to a ring signal on a telephone line using an oscillator.

16. The telephone line interface circuit of claim 15, where the oscillator further comprises a regenerative latch.

17. The telephone line interface circuit of claim 15, the circuit including means for isolating the regenerative latch from a hook switch circuit of the telephone line interface circuit.

18. The telephone line interface circuit of claim 14, where the means for converting the high-speed transient signal into a ring detection signal further comprises:

means for counting a first time period value that is less than a predetermined off-time of the ring signal in response to the high-speed transient signal in order to generate a dump signal;

means for integrating the high-speed transient signal in order to initiate the counting of the first time period;

means for counting a second time period value that is larger than a period of a carrier frequency of the ring signal and clearing the integrated high-speed transient signal responsive to the dump signal; and means for generating a ring detect signal responsive to a time-out of the second time period value.

19. The telephone line interface circuit of claim 18, where the means for converting the high-speed transient signal into a ring detection signal further includes means for monitoring a number of dump signal cycles and disallowing the ring detect signal if the number of dump signal cycles is less than a predetermined number of cycles.

* * * * *